N. POWER.
SAFETY DEVICE FOR MOVING PICTURE MACHINES.
APPLICATION FILED JUNE 6, 1916. RENEWED DEC. 29, 1919.
1,352,218.
Patented Sept. 7, 1920.
2 SHEETS—SHEET 1.
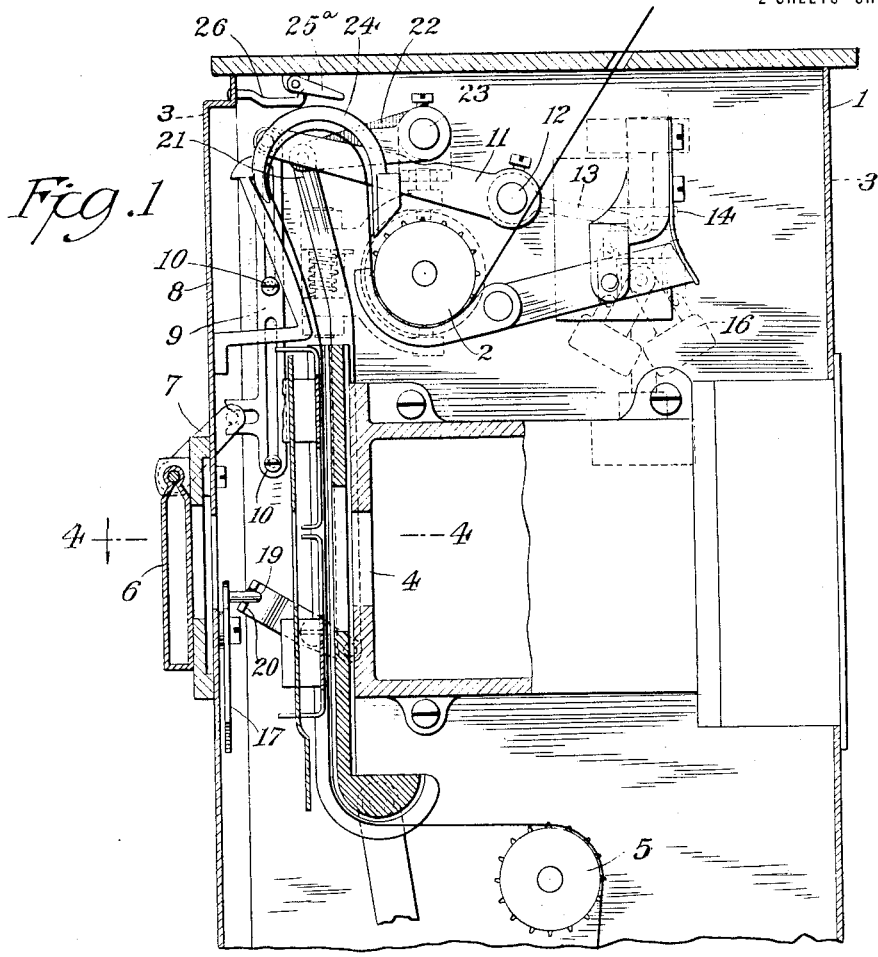
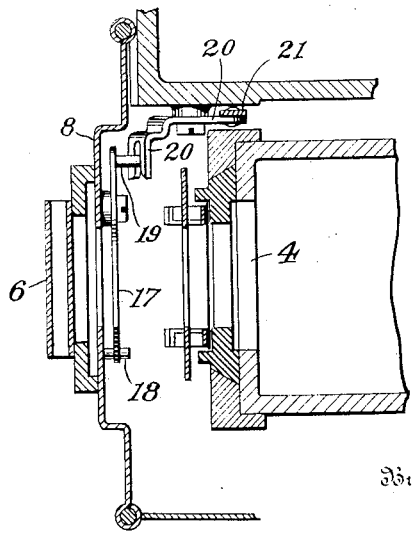

N. POWER.
SAFETY DEVICE FOR MOVING PICTURE MACHINES.
APPLICATION FILED JUNE 6, 1916. RENEWED DEC. 29, 1919.
1,352,218.
Patented Sept. 7, 1920.
2 SHEETS—SHEET 2.
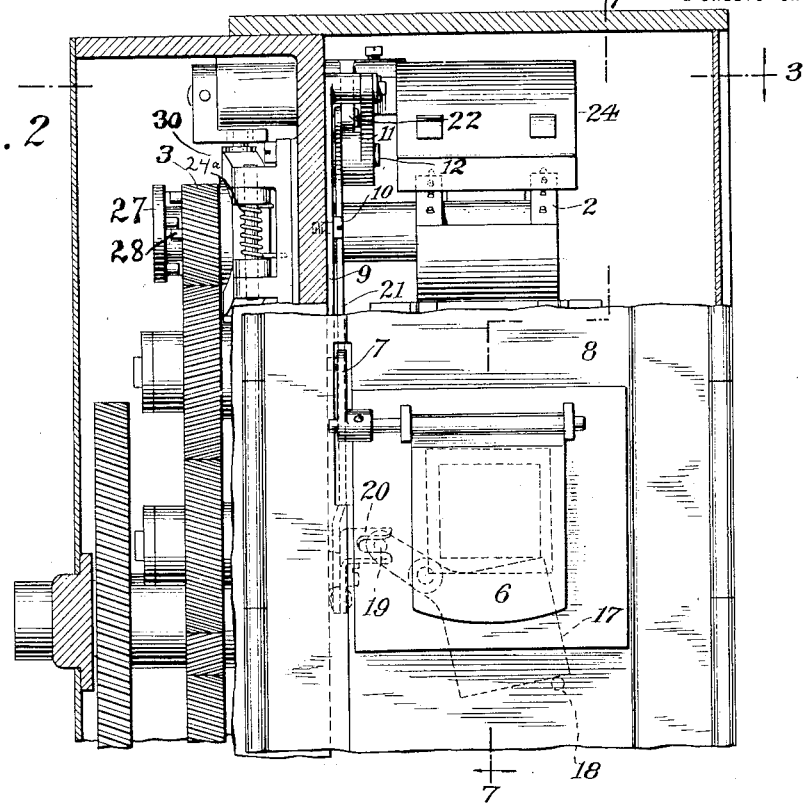
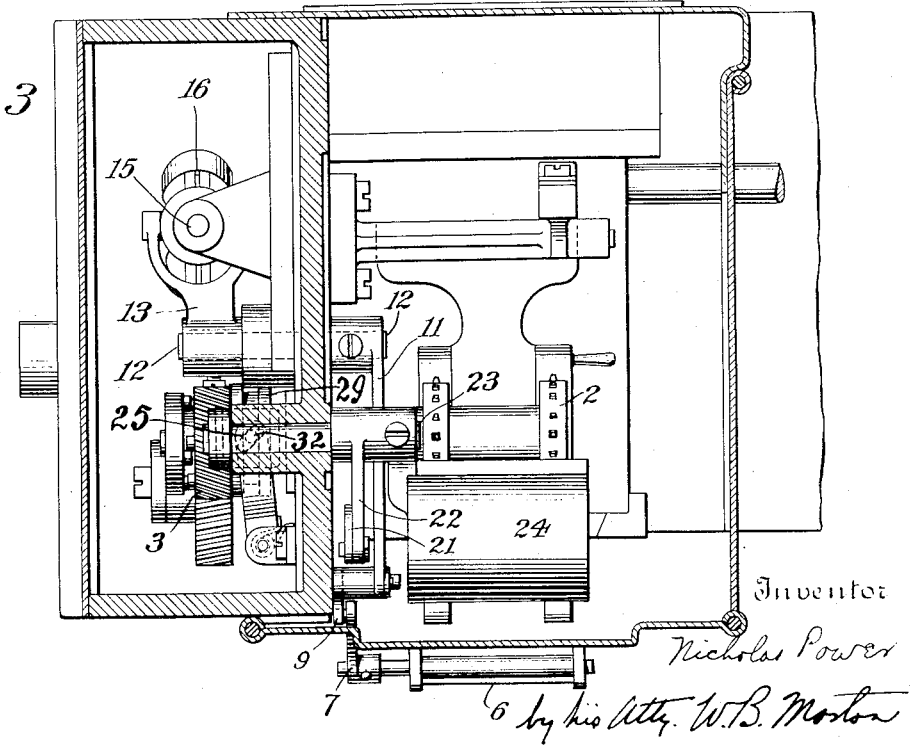
Inventor
Nicholas Power
by his Atty. W. B. Morton

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

SAFETY DEVICE FOR MOVING-PICTURE MACHINES.

1,352,218.     Specification of Letters Patent.     Patented Sept. 7, 1920.

Application filed June 6, 1916, Serial No. 102,070. Renewed December 29, 1919. Serial No. 348,045.

*To all whom it may concern:*

Be it known, that I, NICHOLAS POWER, a citizen of the United States, and a resident of the borough of Brooklyn, county of Kings, city and State of New York, have invented new and useful Improvements in Safety Devices for Moving-Picture Machines, of which the following is a specification.

This invention relates to improvements in safety devices for motion picture machines, and has for its object to provide a safety shutter construction in which a stoppage of the film at the aperture where it will be exposed to the heat of the light rays will positively operate a shutter to cut off the light from the film without interfering with the normal operation of the centrifugal shutter heretofore employed.

A further object of the invention is to provide a mechanism of this class in which the closing of the shutter is accompanied by a disconnection of the upper feed sprocket from its driving gear so as to immediately check the withdrawal of film from the fireproof magazine as soon as the breakdown or other interruption of the feed at the aperture occurs.

A further object of the invention is to provide a mechanism of this character in which the machine may continue in operation with the exception of the other sprocket and with the shutter closed to prevent all danger of ignition of the film so that the feed will have an opportunity to correct itself before the operator need open the casing of the machine to discover the trouble. The principal cause of the stopping of the film at the aperture is defective sprocket holes in the margin of the film. It frequently happens that the torn margins will cause the sprocket to slip on the film but not entirely disengage it, so that upon continued rotation the sprocket teeth may again catch the film and continue its advance through the machine. As the film will ignite upon a very brief exposure when stationary in the light rays, it is essential that the light be cut off instantly upon the film stopping and that the continued operation be allowed only when the shutter is closed until the excess film is taken up.

By the improved construction of this application the auxiliary fire shutter is positively mechanically operated by the movement of the film itself upon departure from its normal path of movement such as occasioned by the continued operation of the upper sprocket when the film is stationary at the aperture, the arrangement being such that an enlargement of the loop between the aperture and the sprocket of hardly more than the length of a single picture will be sufficient to positively close the shutter and release the clutch.

In the accompanying drawings I have illustrated a preferred design of my improved safety shutter construction in which the auxiliary shutter and the usual fire shutter are applied to opposite sides of the rear wall of the machine for independent operation, the machine selected for illustration being the same as that disclosed in my copending application Serial No. 102,068, filed June 6, 1916.

In said drawings,

Figure 1 is a vertical sectional view of the upper portion of a moving picture machine equipped with my improved safety mechanism;

Fig. 2 is a rear view of the portion of the machine shown in Fig. 1 with the parts broken away;

Fig. 3 is a horizontal section on line 3—3 of Fig. 2; and

Fig. 4 is a horizontal section through a portion of the machine at the projection aperture, on the line 4—4 of Fig. 1.

Referring to the drawings, 1 indicates the frame of the machine in the side wall of which the various film feed sprockets are mounted for rotation. The film is fed into the machine by the usual upper sprocket indicated at 2, the sprocket shaft rotating in bearings in the side wall of the frame and having on its outer end a driving gear 3 connected to the gear train of the machine.

From the sprocket 2 the film is guided upwardly in the form of a loop providing a predetermined amount of slack between the sprocket and the projection aperture 4 against which the film is held by the usual tension guides. The film is fed past the aperture by the usual intermittent sprocket 5 driven in any preferred manner from the driving gear train of the machine.

In the machine selected for illustration the tension guides are supported on a hinged wall forming a rear door 8 of the casing, the door being provided with an aperture in line with the projection aperture for the passage of light through the film. Pivoted over the aperture of the door on its outer wall is the usual centrifugal fire shutter 6 whose shaft is provided with an operating crank 7 projecting through the slot in the door 8 of the machine. The crank arm of the shutter 6 is provided with a pin which when the door is closed is engaged by a fork on the end of a bar 9 mounted for vertical movement on pins 10 projecting from the side wall of the frame near its rear edge. The upper end of the bar 9 is connected by a pin and slot joint with a rock arm 11 attached to a rock shaft 12 projecting through the frame wall. Attached to the outer end of the rock shaft is a fork 13 having pins in the ends of its arms which engage with a grooved sleeve 14 mounted for sliding movement on a vertical shaft 15 driven through suitable connection with the gear train of the machine. The sleeve 14 is shifted along the shaft by means of a ball governor 16 of the usual construction, whereby upon rotation of the shaft 15 above a predetermined speed the sleeve will be raised and thereby through the rock arm 11 and bar 9 operate the crank arm of the shutter to swing the shutter outwardly and uncover the opening.

The auxiliary shutter 17 for cutting off the light rays from the film when the film feed is interrupted is pivoted to the inner face of the door for movement in a plane parallel with the face of the door, the pivot pin for the shutter being located just below one corner of the aperture so that a movement of the shutter of 90 degrees will adjust it completely across the aperture. The shutter lies normally below the aperture, its edge resting on a pin 18 set in the door. The shutter is provided with an arm projecting oppositely away from its pivot, the arm being provided at its free end with a pin 19 which is engaged when the door 8 is closed by a fork 20 attached to the lower end of a link 21 suspended for vertical movement against the face of the side frame wall from a rock arm 22 supported on a rock shaft turning in the side frame wall near the top of the machine.

Also attached to the rock shaft is a curved film guide or loop cap 24 lying in front of and above the upper sprocket 2 with its concave face arranged to engage the top of the loop of film between the sprocket and the aperture.

Upon any enlargement of the loop such as would be occasioned by a failure of the intermittent sprocket to advance the film the loop cap will be positively lifted by the upward thrust of the film. The upward movement of the loop cap as thus effected by the enlarged film loop raises the end of the arm 22 thereby depressing the fork 20 and elevating the auxiliary shutter to close the aperture. The enlargement of the loop of film also serves to disconnect the upper sprocket from its driving gear so that no more film will be withdrawn from the magazine until the enlargement of the loop is corrected. To this end the gear 3 of the upper sprocket is not fast to the sprocket shaft, but is connected thereto by a clutch comprising a clutch member 27 attached to the end of the shaft and having inwardly facing pins adapted to be engaged by movable pins 28 mounted to pass through longitudinal holes in the gear 3 and supported in a movable clutch collar 29 slidable on the shaft between the gear 3 and the frame of the machine. The clutch collar is shifted by means of a hinged yoke 30 having upper and lower pins engaging the groove of the clutch collar. The yoke is provided with a spring hinge which holds the clutch normally in engagement until released by the elevation of the loop cap. For this purpose a rock shaft supporting the loop cap is provided on its outer end with an arm 24$^a$ having a horizontal extension between the bearing of the rock shaft, in which extension is formed an inclined cam slot, as shown at 25 in dotted lines in Fig. 3. The cam slot engages the upwardly projecting end of the upper pin 32 of the yoke, whereby the rocking movement of the rock shaft as affected by the loop cap will shift the yoke toward the frame of the machine, thereby disconnecting the clutch. When the extra film causing the engagement of the loop is taken up by the continued action of the intermittent sprocket the weight of the loop cap and the pressure of the spring will reëngage the clutch so that the exhibition of the picture may continue.

To facilitate threading the machine, particularly to prevent too large a loop being originally formed in the film I provide a dog 25$^a$ pivoted to the top of the casing above the loop cap and arranged to hold the loop cap down when the casing door is open. In threading the operator can raise the film against the underface of the loop cap in forming the loop without danger of lifting the loop cap and tripping the clutch. To release the dog when the casing is closed there is provided a projection 26 on the face of the door in position to engage the dog and turn it away from the loop cap in the manner shown in Fig. 1.

I have heretofore proposed to utilize the centrifugal fire shutter 6 as a safety shutter also by providing it with operative connections with a film-actuated part. Such construction has given very satisfactory results but necessarily adds to the complication of the operating devices for the shutter. By my present arrangement, although two shutters are required, each shutter has a simple and direct actuating mechanism reducing the possibility of derangement to a minimum. In a fire hazard apparatus, certainty of operation is the chief requisite, and should outweigh consideration of cost.

I claim:

1. In a moving picture machine a gate or wall having a projection aperture to the rear of the path of the film and a plurality of safety shutters mounted on said gate or wall and coöperating with said aperture, means controlled by the driving mechanism of the machine for operating one such shutter, and means controlled by the film itself for operating the other shutter, said last named means comprising a member arranged adjacent the path of film to be engaged and shifted by a departure of the film from its normal path and positive mechanical connections between said part and said shutter.

2. In a moving picture machine the combination of a part having a light aperture back of the film, a speed controlled safety shutter coöperating with said aperture, an auxiliary shutter also coöperating with said aperture, and means for operating said auxiliary shutter comprising a part overlying the upper loop of the film above the aperture to be elevated by an enlargement of the loop, positive mechanical connections between said part and said shutter for shifting the shutter across the aperture upon an abnormal enlargement of the film loop.

3. In a moving picture machine the combination of a feed sprocket for drawing the film into the machine, a clutch for controlling said feed sprocket, a safety shutter for said machine, and means for operating said safety shutter and said clutch comprising a cap overlying the path of the film between said sprocket and the projection aperture, positive mechanical connections between said cap and said clutch-operating mechanism and the operating mechanism and said shutter whereby the elevation of said cap as effected by an enlargement of the loop of the film in advance of said sprocket will positively open said clutch and close said shutter.

4. In a moving picture machine a frame, a rear gate or wall hinged to said frame, a plurality of safety shutters supported on said gate or wall, operating mechanism for said shutters supported on said frame and positioned to operatively engage said shutters when said gate is closed, speed control devices for actuating one said operating mechanism and a film engaged part for actuating said other operating mechanism.

5. In a moving picture machine a stationary frame, a gate pivoted on said frame, a plurality of safety shutters supported on said gate, independent operating mechanism for said safety shutters supported on said machine frame, speed control mechanism for actuating one of said operating mechanisms and a part mounted adjacent the path of movement of the film to be engaged by the film upon an increase in the amount of slack in the film for actuating the other said operating mechanism.

6. In a moving picture machine the combination of a casing inclosing the film driving mechanism, said casing having a rear door provided with an aperture for the passage of the light from the projecting lantern, a speed-controlled safety shutter mounted on said rear door adjacent said aperture, an auxiliary film-controlled safety shutter mounted on the opposite side of said rear door for coöperation with said aperture, and independent operating means for each of said shutters, said operating mechanism being carried by the stationary portion of the machine casing and brought into operative connection with the shutters inclosing the said door.

Signed at New York city in the county of New York and State of New York this 19th day of May, 1916.

NICHOLAS POWER.